Figure 1:
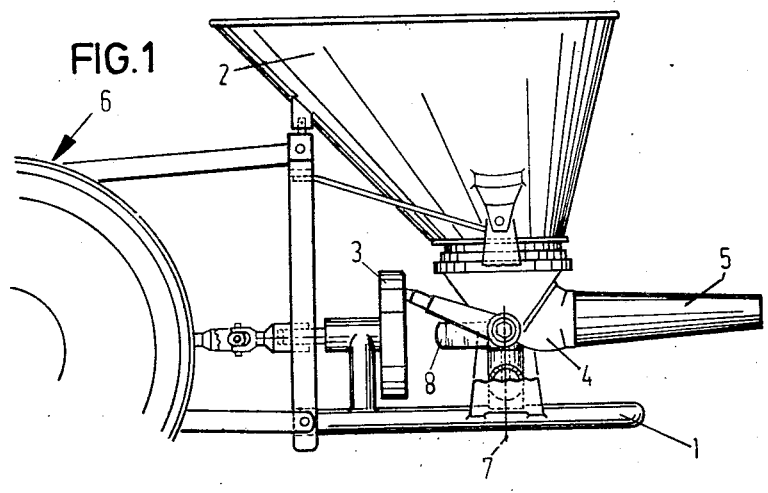

United States Patent [19]
Oosterling et al.

[11] 3,881,659
[45] May 6, 1975

[54] SPREADING DEVICE

[75] Inventors: Pieter Adriaan Oosterling, Nieuw-Vennep; Johannes Philippus Hooftman, Hoofddorp, both of Netherlands

[73] Assignee: H. Vissers, N.V., Nieuw-Vennep, Netherlands

[22] Filed: Nov. 28, 1973

[21] Appl. No.: 419,673

[52] U.S. Cl. ............................................... 239/689
[51] Int. Cl. ............................................ A01c 15/00
[58] Field of Search ...... 239/688, 689; 74/603, 590, 74/591; 248/123, 280, 325, 364

[56] References Cited
UNITED STATES PATENTS

| | | | |
|---|---|---|---|
| 2,479,720 | 8/1949 | Brandt | 248/123 |
| 2,819,618 | 1/1958 | Slusher | 74/590 X |
| 3,467,350 | 9/1969 | Tyler | 248/325 X |
| 3,777,992 | 12/1973 | de Koning | 239/689 |

*Primary Examiner*—M. Henson Wood, Jr.
*Assistant Examiner*—John J. Love
*Attorney, Agent, or Firm*—Synder, Brown and Ramik

[57] ABSTRACT

The invention relates to a device for spreading distributable material, for example, fertilizer, comprising a portable or mobile frame supporting a hopper, a driving mechanism and a distribution pipe joining the open bottom side of said hopper and adapted to be driven by said mechanism in reciprocatory swinging motions; object of the invention is to provide a steadily operating spreading device of simple construction, which is, however, capable of spreading the distributable material over large working widths, which spreading device comprises a counterpois fastened diametrically opposite the distribution pipe with respect to the axis of the swinging motions.

8 Claims, 5 Drawing Figures

SPREADING DEVICE

The invention relates to a device for spreading distributable material, for example, fertilizer, comprising a portable or mobile frame supporting a hopper, a driving mechanism and a distribution pipe joining the open bottom side of said hopper and adapted to be driven by said mechanism in reciprocatory swinging motions.

Since in agriculture there is a growing need for spreading distributable material over larger width, such devices are provided with longer distribution pipes or driven with higher speeds so that a high frequency of the reciprocatory motions is obtained. However, all these steps give rise to unsteady operations of the device and efforts have been made to balance out the distributing mechanism to an extent such that this unsteady operation is obviated. However, with known balanced devices, in which, for example, a counterpois is reciprocated with the same frequency but in the opposite sense, these measures for obtaining balance have led to complicated structures.

Object of the invention is to provide a steadily operating spreading device of simple construction, which is, however, capable of spreading the distributable material over large working widths.

For this purpose the invention provides a spreading device in which a counterpois is fastened diametrically opposite the distribution pipe with respect to the axis of the swinging motions.

The invention is based on the recognition of the fact that it is not necessary to balance out the whole device in itself, that is to say to avoid any transfer of reactive forces to the wagon or tractor carrying the device. If a purely rotary torque is left as a reaction, this torque can be readily absorbed, for example by the lifting bars of the three-point lift of the tractor without involving a lateral vibration of the spreading device. Such a vibration, which is produced by reactive forces exerted in the horizontal plane on the frame, is the cause of the troublesome operation which non-balanced or poorly balanced spreading device may exhibit.

With a spreading device comprising a hopper arranged symmetrically to two vertical, orthogonal planes it is preferred to dispose the counterpois and to proportion the same so that the centre of gravity of the distribution pipe with distributable material contained therein and the counterpois in its central position is located on the vertical going through the centre of gravity of the entire device. With such a symmetrical hopper the centre of gravity will not shift in place during the discharge of the hopper.

If, on the contrary, a hopper of arbitrary shape is used, it is preferred for the centre of gravity of the counterpois and the distribution pipe with the distributable material contained therein to lie on the vertical going through the centre of gravity of the whole device when the hopper is filled to mean capacity.

In order to facilitate balancing of any spreading device and to adapt it to the material to be spread, at least part of the counterpois is adapted to be exchangeable in one embodiment of the device in accordance with the invention, whilst it can be adjusted at different distances from the axis of the swinging motions.

Figure 2:
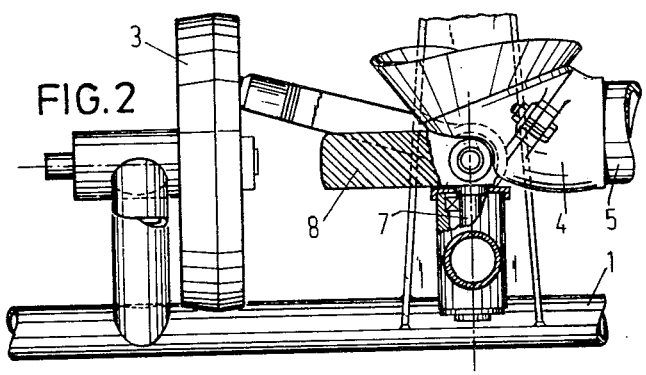
Figure 3:
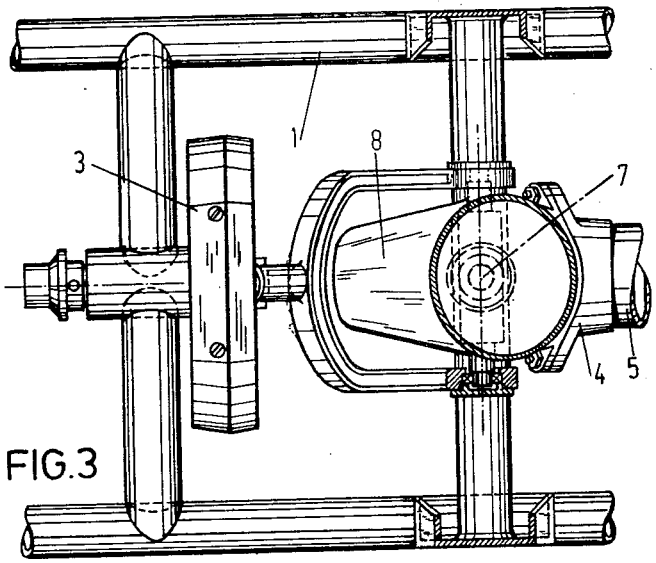
Figure 4:
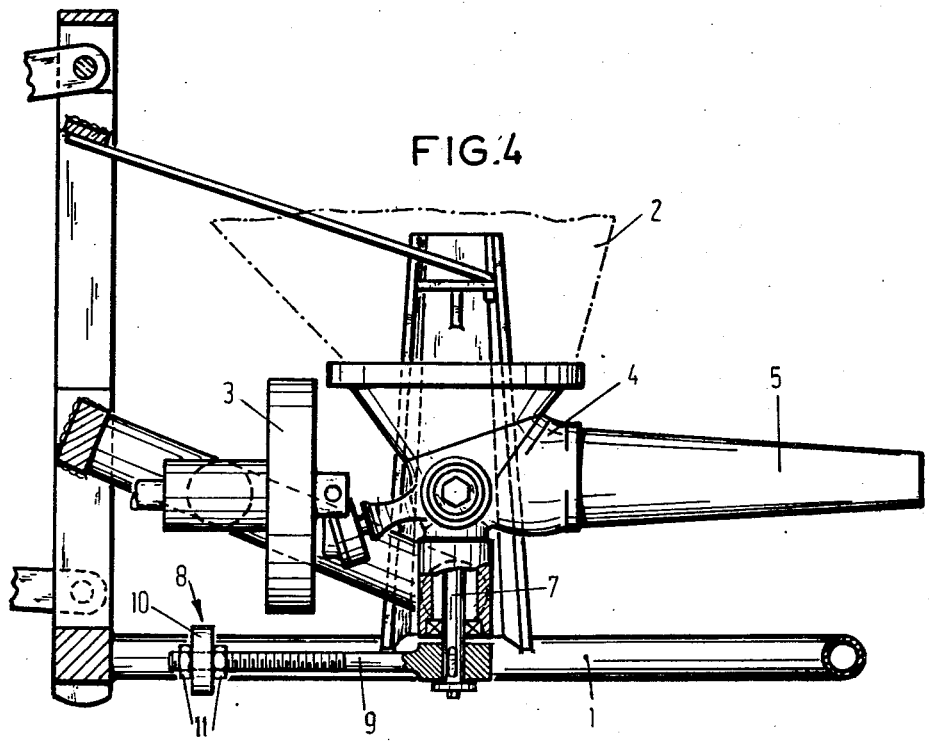
Figure 5:
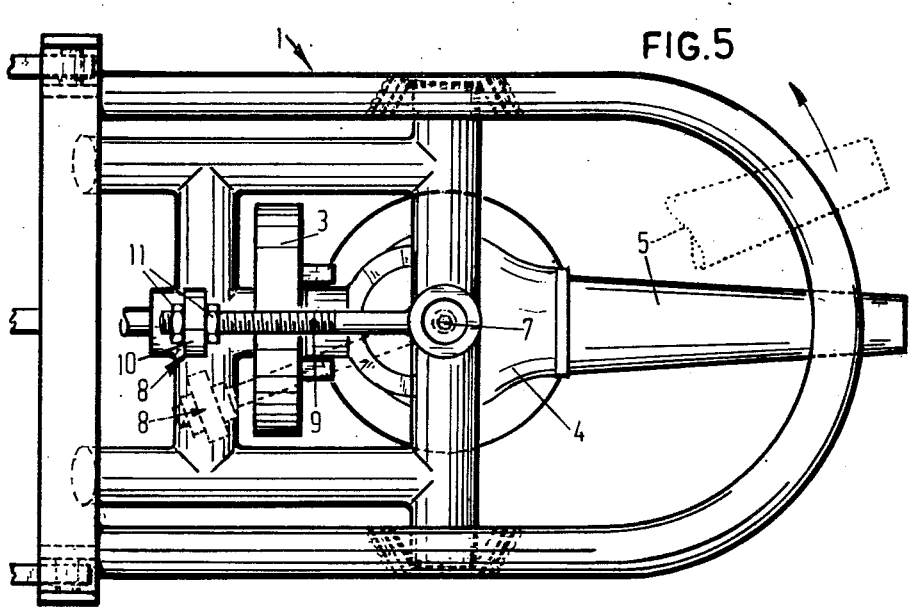

The invention will be described more fully with reference to two embodiments of a balanced spreading device. In the drawing:

FIGS. 1, 2 and 3 are a side elevation, a detailed view and a plan view of this detail respectively of a spreading device comprising a stationary counterpois, FIGS. 4 and 5 are a side elevation and a bottom view respectively of a spreading device comprising a stationary counterpois, FIGS. 4 and 5 are a side elevation and a bottom view respectively of a spreading device comprising an adjustable counterpois.

The Figures show a spreading device comprising a frame 1, a hopper 2, a driving mechanism 3 and a distribution pipe 5, communicating with the open bottom side of the hopper via a hollow, conical body 4. The driving mechanism 3 converts a rotary movement, for example, derived from the power take-off shaft of an agricultural tractor, only the rear wheel 6 of which is shown, into a reciprocatory swinging or oscillatory movement of the hollow, conical body 4 and the distribution pipe 5. The hollow, conical body 4 is fastened to a shaft 7, fastened in the frame 1.

According to the invention a counterpois 8 is arranged diametrically opposite the distribution pipe 5 with respect to the oscillatory shaft 7, the weight of said counterpois being such that the centre of gravity is located on or near the vertical going through the centre of gravity of the whole device. In the embodiment shown in FIGS. 1 to 3 a counterpois of a given weight is permanently secured to the conical body 4. This embodiment is, therefore, only suitable for a given type of distributable material or a given charge, that is to say, a given quantity of distributable material to be spread on the field.

Since the vertical going through the centre of gravity of the whole device need not coincide with the centre line of the shaft 7, it will be obvious that only in one given position the centre of gravity of the counterpois and the distribution pipe with the distributable material contained therein can lie on said vertical, said position of the distribution pipe corresponds with the central position of the distribution pipe during its oscillations in devices of a construction symmetrical to the central, longitudinal plane.

FIGS. 4 and 5 show a different structure of the counterpois 8. In this embodiment the counterpois is fastened to the prolonged lower end of the oscillatory shaft 7 and at its free end the counterpois has the shape of a wire bar 9 with a displaceable body 10, which can be fixed in place by two nuts 11. As a matter of course, the body 10 can be replaced by bodies of a different weight. Therefore, this embodiment permits of readily balancing and adapting the device to any kind of distributable material.

What is claimed is:

1. A device for spreading distributable material, comprising in combination:

a frame adapted to be attached by a conventional hitch to a tractor;

a hopper mounted on said frame and having an open lower end;

a distribution pipe assembly located at the lower end of said hopper to receive material therefrom, said assembly including a generally horizontal distribution pipe adapted to oscillate about a generally vertical axis thereby to spread the material over a wide swath;

pivot means mounting said distribution pipe assembly for oscillation relative to said hopper and said frame about said axis;

drive means for imparting said oscillation to said distribution pipe assembly; and counterweight means attached to said distribution pipe assembly and disposed on that side of said axis diametrically opposite said distribution pipe for oscillatory movement in unison with said assembly to balance out reactive forces which tent to impart lateral vibration of the spreading device.

2. A device as defined in claim 1 wherein the center of gravity of said counterweight means lies along a vertical line passing through the center of gravity of the whole device when the distribution pipe is in a central, longitudinally rearwardly extending position and said hopper is at least filled to mean capacity.

3. A device as defined in claim 2 wherein said hopper is symmetrical about orthogonal vertical planes intersecting at said vertical axis whereby the vertical coincidence of the centers of gravity is independent of the amount of material in the hopper.

4. A device as defined in claim 2 wherein said hopper is symmetrical with respect to a fore and aft vertical plane passing through said vertical axis but is asymmetrical with respect to a vertical plane orthogonal to the first mentioned plane at said axis whereby the vertical coincidence of the centers of gravity is effective only when the hopper is filled to mean capacity.

5. A device as defined in claim 1 wherein said counterweight means includes a removable weight and means for adjusting the distance of said weight from said axis.

6. A device as defined in claim 2 wherein said counterweight means includes a removable weight and means for adjusting the distance of said weight from said axis.

7. A device as defined in claim 3 wherein said counterweight means includes a removable weight and means for adjusting the distance of said weight from said axis.

8. A device as defined in claim 4 wherein said counterweight means includes a removable weight and means for adjusting the distance of said weight from said axis.

* * * * *